3,654,219
NOVEL FIBER GLASS-REINFORCED RESIN COMPOSITIONS AND PROCESSES FOR THEIR PREPARATION

William M. Boyer, 514 S. Roosevelt Drive 47714, and Kiyoshi Hattori, 1110 Harrelton Court 47715, both of Evansville, Ind.
No Drawing. Filed June 19, 1968, Ser. No. 738,112
Int. Cl. C08f 45/10
U.S. Cl. 260—41.5          5 Claims

ABSTRACT OF THE DISCLOSURE

Novel fiber glass reinforced resin compositions which comprise blends of glass fiber reinforced resin concentrates with unreinforced resins and processes therefor, particularly a process of blending glass fiber reinforced thermoplastic resin concentrates with thermoplastic resins, the glass-fiber containing resin being dissimilar from the unreinforced blending resin, said dissimular resin comprising from 5 to about 30 percent by weight of the composition.

FIELD OF INVENTION

This invention relates to the manufacture of blends of glass fiber reinforced resins with thermoplastic resins and more particularly to blends of glass fiber-reinforced thermoplastics with unreinforced resins to give novel blended compositions of glass fiber reinforced resins adapted for molding. The novel compositions herein are particularly adapted for injection, extrusion and transfer molding. Further, the compositions provided by the process of this invention produce, when molded or extruded, articles which have high dimensional stability, high modulus of elasticity, high tensile strength, unusually high impact strength and low shrinkaged during molding.

PRIOR ART

Glass fiber reinforced resins are widely employed commercially with glass fibers or rovings being used in such resins as acrylonitrile-butadiene-styrene (ABS), styrene-acrylonitrile copolymer, polystyrene, polyethylene, polypropylene, nylon and the like. It is necessary to obtain improved properties in these resins such as high impact strengths, high heat distortion and others for their intended use as molding resins, particularly injection molding.

Recently a new concept has been developed for manufacture of glass-fiber filled injection molded thermoplastics compositions which involves preparing new compositions of glass fiber concentrated thermoplastics which are then "cut-back" or "let down" or diluted with unreinforced resin to ultimately result in an injection molding composition prepared substantially in-situ at the inlet to an extruding or molding machine. In a typical case a polystyrene concentrate is prepared in pellet form containing about 80% glass fiber of a length of up to ¼" or more, the remainder being polystyrene and smaller quantities of additives and this concentrate is then blended with three parts of unreinforced polystyrene at the throat of a molding machine to result in a molded article containing 20 percent glass-fiber, an amount ideally suited for the improvement of certain properties of this resin. Other thermoplastic resins have also been prepared containing high glass-fiber contents ranging from 40 to 90 percent preferably around 60 to 80 percent for use in blending with similar resins at the site of article manufacture. It has been found that this is an economic method of operation, being clean and possessing many unique advantages over those systems which require cutting of glass fibers directly over the molding machines.

Although, as indicated above, important and noteworthy strides have been made in the field of glass fiber reinforced thermoplastics so that this important and relatively new field is growing rapidly, there are, as in any other new technology, areas where further improvements are necessary, such areas presenting particular problems for resolution. Thus while the preparation of concentrates of glass fiber has indeed resolved a serious problem in manufacture of glass fiber reinforced thermoplastics, the manufacturer now finds that inventory becomes a problem and that in order to provide a wide segment of industry a wide variety of uses for glass fiber filled thermoplatsics, concentrates for each such thermoplastic must be prepared and held until used or moved. This involves therefore preparing and storing a variety of resin concentrates.

Additionally, some resin concentrates may not be readily prepared because of apparatus limitation and/or peculiar properties of the resin which makes it difficult to prepare except in specially designed equipment, all of this meaning loss of business and inability to supply a particular market which in many instances may be more profitable than others. It is apparent that resolution to problems indicated herein is desired and research into such resolutions has heretofore thus been undertaken for such resolution.

STATEMENT OF INVENTION

It is an object of this invention to prepare novel glass-fiber reinforced thermoplastic resin compositions.

It is another object of this invention to provide improved high impact strength injection molding compositions.

It is still another object of this invention to provide a process for blending employing glass fiber reinforced resin concentrates with other resins.

It is a further object of this invention to employ glass fiber reinforced resin concentrates for blending with resins wherein the concentrate resin is dissimilar from that of the unreinforced resins.

These and other objects of the present invention will be apparent from the descriptions and examples set forth hereinafter.

It has now been found that it is possible to prepare novel glass fiber reinforced thermoplastics by a process comprising blending in appropriate proportions an unreinforced thermoplastic resin which will be employed in major proportion and a dissimilar resin having from 40 to 90 percent by weight of glass fiber therein in minor proportions to result in superior molding resin compositions. It was surprising and unexpected to discover that even incompatible resins could be thus blended and that molding resin compositions of outstanding physical properties could be produced.

Although the resin containing the glass fiber is, as indicated, employed ordinarily as the minor component, some situations may arise where it will be employed in major proportion. An example of this situation is the case where a polystyrene containing 40 percent glass fiber reinforcement is blended with polyphenylene oxide (PPO) in a proportion of two parts polystyrene concentrate to one part "PPO" thereby resulting in the polystyrene being the resin employed in major proportion. In general, however, as stated above, the resin used to carry the glass fiber is employed in minor proportion in this invention.

The invention, in addition to the process hereinabove, also encompasses new compositions of matter involving intimate blends of (a) a thermoplastic resin containing from 40 to 90 percent by weight of glass fiber, (b) an unreinforced thermoplastic resin employed in major proportion, the said (a) resin component containing the glass fiber being dissimiliar from the (b) thermoplastic resin components and said (a) resin and (b) resin being at least partially soluble or if not soluble, compatible in the sense of the (a) resin being dispersible in the (b) resin. The melting point (° F.) of the (a) resin should, according to this invention, not be higher than that of the (b) resin by more than 10 to 20 percent, preferably the melting point should be about the same or lower than that of the (b) resin.

In general, a blend is made from a mixture of concentrate and unreinforced resin. For example, a blend containing 20% fiber glass would be made from a mixture of one part 80% glass concentrate and three parts unreinforced resin. This mixture could be dry blended in a typical blending apparatus such as a drum tumbler. The dispersion in a final molded article is achieved by blending in a molding machine such as a screw press. In all final molding operations, melt blending is involved.

In order to understand further some of the terms used in the specification herein, the following terms shall have the meaning noted:

(a) Short glass fibers (or short fiberglass)—These are glass fibers having a maximum length of up to one-eight (⅛) of an inch. They may be as short as 0.02 inch as noted above in reference to the prior art.

(b) Long glass fibers—These are glass fibers having a length above one-eight (⅛) of an inch and generally range between one-fourth (¼) to one-half (½) of an inch.

(c) Concentrate or concentrate resin—This designation refers to the resin employed as the fiber glass carried. The resin is preferably a thermoplastic material having a melting point lower than that of the unreinforced resin. Unless otherwise noted, the amount of glass will be 80% by weight in this resin.

(d) Unreinforced resin—This refers to the resin to be reinforced with glass fibers by blending with the concentrate resin.

(e) Compatibility or compatible means that the concentrate resin is soluble in the unreinforced resin to the extent of at least 5 percent by weight at the melt temperatures or if not soluble the resin will be capable of being dispersed in the unreinforced resin at the melt temperatures along with the glass fiber substantially uniformly and without substantially altering the physical properties of the unreinforced material.

In the compositions of this invention, as indicated above, the glass-fiber-containing resin will be the resin to be employed in minor proportion and the amount will range from about 3 preferably 5 to 30 percent of the total weight of the ultimate resin composition. The unmodified or blending resin which will be reinforced by the glass-fiber of the concentrate will be present in major proportion and this amount will be from 95 to 70 percent based on the resins (excluded are therefore the weights of glass fiber and miscellaneous additives). The total glass fiber content by weight in the final product will depend on the particular use but in general can range from about 15 percent to about 40 percent by weight. It is within this quantity range that the maximum physical property enhancement is realized in these resinous compositions. From the above it will be appreciated that the glass fiber concentrate will be one containing from 40 to about 80 percent by weight of glass-fiber and will be the material to be used for blending with other resins as will be illustrated in detail hereinbelow.

Although it has been found, as indicated above, that even some incompatible resins were rendered compatible by the technique of this invention, in general, it is preferred to employ as blending compositions two resins (or more) which are not substantially incompatible. Thus where two resins in unreinforced form are melt blended, it is preferred that if one were to blend equal parts of such that one resin would disperse or dissolve in the other to an extent of at least 5 percent. It should be understood that the term "blending" as used herein means that two resins are mixed in the melt, that is it is melt blending of two or more different resins.

PREFERRED EMBODIMENTS

In accordance with one preferred embodiment herein, the melt index of the resin used as glass-fiber carrier should not be lower than that of the unmodified resin to be used as blending stock, preferably the melt index should be at least the same or ten percent higher (or more) than the melt index of the unmodified resin. When the concentrate resin which carries the glass-fiber has such a higher melt index, both resin and glass fiber disperse more readily into the melt of the unmodified resin.

The melting point of the concentrate resin is preferably below the melting point of the unreinforced resin as hereinbefore noted and the melting points of both the unreinforced and the concentrate resins can vary widely such as from 5° F. to 200° F. or even higher.

The resins which may form the basis of the concentrate and/or of the unreinforced resin may be any thermoplastic resin. Such thermoplastic resins include polystyrene, the acrylic resins, acrylonitrile-butadienestyrene (ABS) resins, polyvinyl chloride resins, polyformaldehyde resins, polysulfone resins, polyphenylene oxide resins, polyamide resins such as nylon, polyester resins, polyolefin resins, polycarbonate resins, and many others.

The rovings or glass strands used in this invention can be sized with many commercially available sizes such as polyesters, polyvinylacetates and/or coupling agents of the silane or chrome-complex type.

The blending can be done in any conventional manner and in any standard equipment used for melt blending. Although it is possible to make the blended reinforced resins having a wide variation of glass content, a range of 15 to 40 percent appears practical and in fact, the preferred blended compositions contain from 20 to 30 percent glass reinforcement.

The concentrate resin can contain additives such as dispersion aids, that is mineral oils and any other additives commonly useful in this art. The unreinforced resin can likewise contain additives, which are not incompatible with the ultimate compositions.

The concentrates of this invention can be prepared by prior art procedures employing preferably long fiber-glass. Such procedures are described in Bradt Pat. 2,877,501 and in copending application Ser. No. 677,969, filed Oct. 25, 1967, now abandoned relating to techniques specific for preparing very high glass fiber concentrates such as 80 to 90 percent.

The blending of the compositions can be done, in addition to melt blending, by admixing the glass fibers with the concentrate resin in latex form and then adding the unreinforced resin; or it can be accomplished by simultaneous fluxing of the two latices into the glass reinforcement strands.

It has been found particularly useful to use polystyrene or styrene-acrylonitrile resin glass-reinforced concentrates with polycarbonates, nylons, ABS resins, polyethylene, polypropylene, EP rubbers, styrene-butadiene copolymers, and the like.

The examples and tables to be presented hereinbelow, the tests indicated correspond to tests carried out in accordance with ASTM procedures (unless otherwise indicated):

| | |
|---|---|
| Tensile p.s.i. | D638 |
| Elongation percent | D638 |
| Flexural p.s.i. | D790 |
| Deflection temperature ° F. | D648 |
| Izod ft. l./in. | D256 |
| Water absorption | D570 |
| Specific gravity | D792 |

The invention will be more fully understood by reference to the following illustrative embodiments.

EXAMPLE 1

One part of an 80 percent glass fiber reinforced styrene-acrylonitrile (SAN) resin was blended with three parts ABS. This blend gives a 20 percent glass fiber product. As a control a 20% glass fiber reinforced ABS resin was provided.

In molding the blended composition it was found that this material molds much easier and better than glass fiber reinforced ABS resin. Good surface finish was observed, and the parts did not stick to the mold.

The physical properties of the two runs are tabulated in Table I below. The blend of glass fiber reinforced SAN with ABS shows very good unexpected properties.

TABLE I

| | Blend | ABS 20% glass |
|---|---|---|
| Properties: | | |
| Tensile strength, p.s.i. | 13,090 | 14,330 |
| Elongation, percent | 2.3 | 2.50 |
| Flexural strength, p.s.i. | 17,930 | 17,620 |
| Izod impact, ft. lb./in. | 2.11 | 1.84 |
| Water abs., 24 hrs. | 0.23 | 0.26 |
| Deflection temp. 264° F. at 264 p.s.i. | 230 | 236 |
| Glass content, percent | 20 | 20 |
| Resin materials: | | |
| ABS content, percent | 75 | 80 |
| SAN concentrate, percent | 5 | 0 |

The above demonstrates that a mixture of glass reinforced SAN resin when melt blended with ABS and molded to give complete mixing of the ingredients gives a product of equivalent properties as the more expensive 100% reinforced ABS. Advantages are as shown: better flow than straight ABS and a good finish.

Table II below demonstrates another aspect of this invention involving the blending of different resin. In this case one part of an 80% glass fiber reinforced resin is blended with three parts of high density polyethylene. The table also shows blending with ABS in the same manner.

The above table shows that two incompatible resins such as polystyrene and polyethylene can be blended according to the process herein to result in composition which while having lower tensile properties nevertheless are good blends and show improvement in other important properties. There is also shown the use of 80% polystyrene concentrate to blend with ABS as shown. The polystyrene content in polyethylene amounted to 5%; glass fiber 20%; and the remainder (75%) was polyethylene. In the ABS example the dilution occurred similarly with one part polystyrene concentrate and three parts ABS resin.

EXAMPLE 2

When blends were made with various resins employing polystyrene containing about 80% long glass fiber as the glass source, similarly good results are obtained. Blends of this concentrate with nylon as well as blends of a concentrate of SAN with nylon have given good results.

In Table III below there is shown the results of melt blending of polycarbonate (General Electric Company trademarked product "Lexan") and polysulfone with concentrate resins of polystyrene and styrene-acrylonitrile copolymer containing 80% long glass fiber therein. Properties of a 20 percent long glass fiber polysulfone are also shown for comparison.

TABLE III

| | Part A | | | Part B | | |
|---|---|---|---|---|---|---|
| Properties | Polycarbonate with polystyrene | Polycarbonate with SAN | Polycarbonate with 20% long glass | Polysulfone with polystyrene | Polysulfone with SAN | Polysulfone with 20% long glass |
| Tensile strength, p.s.i. | 9,490 | 15,450 | 14,000 | 13,200 | 18,016 | 19,000 |
| Elongation, percent | 1.17 | 2.26 | 3.0 | 1.61 | 1.82 | 2.0 |
| Flexural strength, p.s.i. | 14,700 | 20,030 | 17,000 | 18,660 | 22,000 | 23,500 |
| Izod impact, ft. lbs./in. | 1.99 | 1.50 | 1.5 | 1.08 | 1.44 | 2.5 |
| Deflection temp. (264 p.s.i.), °F. | 276 | 290 | 285 | 330 | 310 | 333 |
| Water abs., 24 hours | 0.13 | 0.15 | 0.15 | 0.24 | 0.21 | 0.21 |
| Glass content, percent | 20 | 20 | 20 | 20 | 20 | 20 |

Table III, Part A and B, shows that of the two concentrate resins used in preparing the blends that SAN is preferred even though the polystyrene concentrate still gives useful and adequate reinforcement for many applications.

The table below shows results obtained by blending various cencentrates with nylon 6. Part A shows a polyethylene (high density) concentrate (80% long glass fiber) blended with nylon 6 to give a blend with 20% glass; a polystyrene concentrate (80% glass) with nylon 6 to give a final 15% glass content and similarly a SAN concentrate. Part B shows higher glass contents and Part C shows direct glass reinforcement values.

TABLE IV

| | Part A | | | Part B | | Part C | |
|---|---|---|---|---|---|---|---|
| Properties | Polyethylene concentrate and Nylon 6 | Polystyrene concentrate and Nylon 6 | SAN concentrate and Nylon 6 | Polystyrene concentrate and Nylon 6 | SAN concentrate and Nylon 6 | Nylon 6 | Polyethylene |
| Tensile strength, p.s.i. | 14,880 | 11,980 | 12,800 | 14,060 | 15,040 | 21,000 | 9,000 |
| Elongation, percent | 2.14 | 1.80 | 2.22 | 1.42 | 1.37 | 3.5 | 3 |
| Flexural strength, p.s.i. | 19,010 | 16,740 | 17,050 | 18,850 | 22,080 | 26,000 | 11,000 |
| Izod impact, ft. lbs./in. | 1.59 | 0.73 | 0.96 | 0.81 | 1.73 | 1.4 | 1.7 |
| Deflection temp. (264 p.s.i.), °F. | 402 | 394 | 378 | 394 | 362 | 400 | 245 |
| Water abs., 24 hrs. | 1.28 | 1.39 | 1.49 | 1.11 | 1.10 | 1.30 | .05 |
| Glass content, percent | 20 | 15 | 15 | 30 | 30 | 30 | 30 |

TABLE II

| Properties | Blend of polystyrene concentrate with polyethylene | Blend of polystyrene with ABS |
|---|---|---|
| Tensile strength, p.s.i. | 4,910 | 11,260 |
| Elongation, percent | 0.99 | 1.52 |
| Flexural strength, p.s.i. | 6,450 | 14,090 |
| Izod impact ft. lbs/in. | 0.99 | 0.72 |
| Deflection temp. (264 p.s.i.) °F. | 234 | 218 |
| Water abs., 24 hrs. | 0.03 | 0.25 |
| Glass content, percent | 20 | 20 |

The above resin concentrates such as SAN and polyethylene used in blending with nylon 6 show some losses in properties such as tensile and flexural strength but still provide a good high temperature glass reinforced composition for many uses. Also as noted the best improvement in properties is obtained by blending polyethylene concentrate with nylon 6.

Table V below, Part A, shows blends of the resin concentrates polyethylene nad polystyrene with nylon 6/6 while Part B shows concentrates of SAN and polystyrene blended with crystalline polypropylene.

TABLE V

| Properties | Part A | | | Part B | | |
|---|---|---|---|---|---|---|
| | Polyethylene concentrate with Nylon 6/6 | Polystyrene concentrate with Nylon 6/6 | Nylon 6/6 | Polystyrene concentrate with polypropylene | SAN concentrate with polypropylene | Polypropylene |
| Tensile strength, p.s.i. | 16,800 | 16,220 | 20,000 | 6,370 | 6,610 | 5,500 |
| Elongation, percent | 1.45 | 1.43 | 3.0 | | | 3.0 |
| Flexural strength, p.s.i. | 22,850 | 21,500 | 26,000 | 8,980 | | 7,000 |
| Izod impact, ft. lbs./in. | 1.97 | 0.92 | 1.2 | 1.18 | 1.19 | 1.0 |
| Deflection temp. (264 p.s.i.), °F | 492 | 481 | 480 | 236 | 245 | 230 |
| Water abs., 24 hrs. | 0.85 | 0.74 | 0.93 | 0.03 | | 0.05 |
| Glass content, percent | 30 | 30 | 30 | 20 | 20 | 20 |

The above table shows the further blending of dissimilar concentrate resins with unreinforced resins and the useful property improvements obtained thereby.

EXAMPLE 3

In the following tables and this example, concentrate resins polystyrene, polyethylene and SAN were used for blending with a blend mixture of polyphenylene oxide and polystyrene; polyformaldehyde and polysulfone in a 3:1 ratio (unreinforced resin: concentrate—80% glass fiber) to obtain a 20% long glass fiber product reinforcement.

TABLE VI

| Product | Polyacetal ("Celcon") with 20% glass | Polyethylene concentrate and polyacetal | Polystyrene concentrate and polyacetal | SAN concentrate and polyacetal |
|---|---|---|---|---|
| Tensile strength, p.s.i. | 11,000 | 9,100 | 10,300 | 11,100 |
| Elongation, percent | 2.3 | 1.6 | 1.3 | 1.5 |
| Flexural strength, p.s.i. | 15,000 | 11,700 | 13,000 | 13,100 |
| Izod impact, ft.-lbs./in. | 2.8 | 1.3 | 1.0 | 1.0 |
| Deflection temperature at 264 p.s.i., °F | 325 | 220 | 256 | 257 |
| Glass content, percent | 20 | 20 | 20 | 20 |

While the deflection temperature was lowered considerably it must be remembered that unreinforced polyacetal has a deflection temperature 204° F.

EXAMPLE 4

The following table shows the use of SAN concentrate (80% glass fiber) for blending with polyphenylene oxide (General Electric trademarked product "PPO").

TABLE VII

| Product | PPO with 30% glass fiber | SAN concentrate with PPO | SAN concentrate with PPO |
|---|---|---|---|
| Tensile strength, p.s.i. | 18,000 | 17,800 | 20,100 |
| Elongation, percent | | 1.8 | 1.6 |
| Flexural strength, p.s.i. | 24,400 | 21,400 | 21,000 |
| Izod impact, ft.-lbs./in. | 1.7 | 1.4 | 1.7 |
| Deflection temperature at 264 p.s.i., °F | 360 | 325 | 300 |
| Glass content, percent | 30 | 20 | 30 |

The blends of SAN concentrate and PPO were easier of mold than normal reinforced PPO. The properties as noted are excellent. In another example, a blend of PPO with polystyrene was blended with SAN concentrate, and polyethylene concentrate and polystyrene concentrate to give excellent improvements in properties such as impact strength over the unreinforced resin. In all cases the concentrate blends were easier to mold than the normal unreinforced resin. Resort can be had to modifications falling within the spirit and scope of this invention.

What is claimed is:

1. A process for incorporating glass fibers into a thermoplastic composition which comprises forming a component (A) comprising a thermoplastic resin containing about 40 to 90 wt. percent glass fibers, intimately blending component (A) with component (B) comprising a thermoplastic resin chemically different from the resin of component (A), the amount of component (A) being sufficient to provide about 5 to 40 wt. percent of the total resin in the composition, the resin of component (A) having a melting point lower than the melting point of the resin of component (B) and a melt index at least ten percent higher than the melt index of the resin of component (B), and recovering a glass fiber reinforced thermoplastic composition wherein the fibers are intimately dispersed throughout the total resin.

2. A process according to claim 1 wherein the resin of component (A) is a styrene-acrylonitrile copolymer, polystyrene, or polyethylene.

3. A process according to claim 1 wherein the resin of component (B) is nylon, polypropylene, polyethylene, acrylonitrile-butadiene-styrene polymers, polycarbonate, polyacetal, polyphenylene oxide, or polysulfone.

4. A process according to claim 1 wherein the recovered glass fiber reinforced thermoplastic composition is molded or extruded into a shaped article.

5. A process for incorporating glass fibers into a thermoplastic composition which comprises forming a component (A) comprising a thermoplastic resin containing about 40 to 90 wt. percent glass fibers, tumbling component (A) with component (B) comprising a thermoplastic resin chemically different from the resin of component (A), the amount of component (A) being sufficient to provide about 5 to 40 wt. percent of the total resin in the composition, the resin of components (A) having a melting point lower than the melting point of the resin of component (B) and a melt index at least ten percent higher than the melt index of the resin of component (B), and thereafter melt blending the mixture of component (A) and component (B) and recovering a glass fiber reinforced thermoplastic composition wherein the fibers are initimately dispersed throughout the resin.

References Cited

UNITED STATES PATENTS

| 3,236,914 | 2/1966 | Murdock et al. | 260—874 |
| 3,340,123 | 9/1967 | Osmon | 260—897 A |
| 3,431,225 | 3/1969 | Duncan | 260—897 A |
| 3,440,208 | 4/1969 | Foglia et al. | 260—897 A |

FOREIGN PATENTS

| 1,411,274 | 8/1965 | France. |
| 1,250,117 | 9/1967 | Germany. |

OTHER REFERENCES

Modern Plastics Encyclopedia 1965, McGraw-Hill, N.Y., September 1964, pages 512–513.

MORRIS LIEBMAN, Primary Examiner

H. H. FLETCHER, Assistant Examiner

U.S. Cl. X.R.

260—37 R, 37 N, 37 PC, 41 AG, 41.5 MP, 897 A